Figure 1:
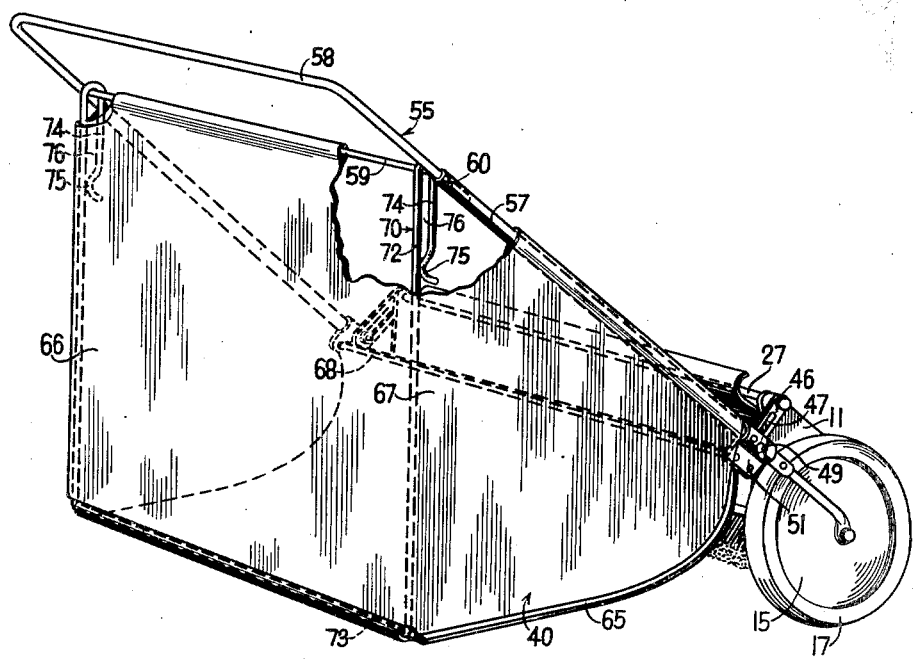

United States Patent Office 2,705,644
Patented Apr. 5, 1955

2,705,644

LAWN SWEEPER IN WHICH THE HANDLE CAN BE LOWERED INDEPENDENTLY OF THE DEBRIS RECEPTACLE CARRIED THEREBY

Earl E. Stelzer, Springfield, Ohio, assignor to Parker Sweeper Company, Springfield, Ohio, a corporation of Ohio Application February 7, 1952, Serial No. 270,322

8 Claims. (Cl. 280—36)

The present invention relates to apparatus such as lawn sweepers or lawn mowers in which a receptacle for catching grass clippings or other debris is carried by the handle of the machine, and more particularly to a support for a handle which is also utilized as a means for maintaining a collapsible receptacle in its fully opened position.

It is an object of this invention to provide a simplified sweeper construction whereby the brushing element can be momentarily raised and lowered during the sweeping operation for cleaning uneven surfaces.

It is another object of this invention to provide a simplified sweeper construction having a handle support mounted to the debris receptacle in such a manner that the handle is supported inclined at a convenient angle, yet free to be manipulated within certain limits, for vertically adjusting the brushing element when an uneven surface is being swept.

It is another object of this invention to provide a simplified sweeper construction with a handle supporting element connected to the handle by a spring pressed latch so that the handle supporting element can be readily detached from the handle for folding.

It is another object of this invention to provide a simplified sweeper construction with a debris receptacle having a resilient bottom and flexible side and rear walls, in combination with a handle supporting element, said combination being adapted so that both the debris receptacle and the handle supporting element can be folded flat with the handle for compactness in shipping and storage.

Further objects and advantages of the present invention will be apparent from the following description, reference being had to the accompanying drawings wherein a preferred form of embodiment of the invention is clearly shown.

Figure 2:
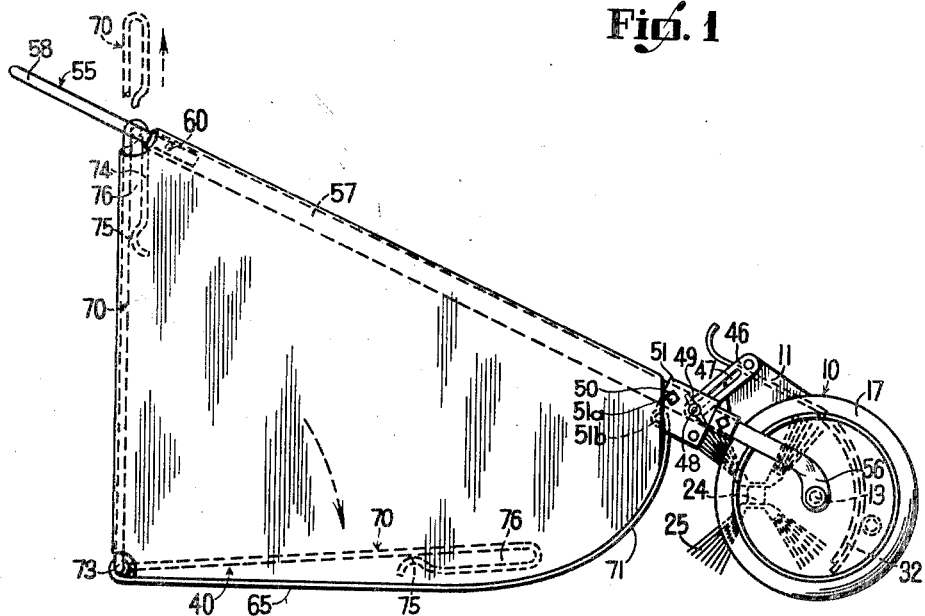

In the drawings:

Fig. 1 is a perspective view of a sweeper constructed in accordance with the present invention; and Fig. 2 is a side elevational view of the sweeper, shown in Fig. 1.

Referring more in detail to the drawing, we have chosen to illustrate our invention in connection with a lawn sweeper which is more clearly shown and described in application Serial Number 87,522, filed April 14, 1949, and in the divisional applications thereof Serial Number 201,955 and Serial Number 201,956, both of said divisional applications having been filed December 21, 1950.

In the accompanying drawing, the sweeper shown has a frame indicated generally at 10 which includes a pair of oppositely disposed side plates 11. Each of these plates is cast with a stationary axle means in the form of an insert 13. A pair of spaced wheels 15 are rotatably mounted on the axle means and disposed on opposite sides of the frame. These wheels are provided with rubber tires 17.

A system of gears, not shown, are provided to drive the shaft 24 upon which brush 25 is mounted. Forward motion of the sweeper rotates brush 25 in a counter-clockwise direction, as viewed in Fig. 2.

The brush 25 is raised and lowered relative to the surface being swept by rotating the frame 10 and hence the brush 25 about the axis of axles 13. Such rotation being relative to a stationary position of a handle 55, and confined to a limited arc by the brush adjusting brackets 46, Fig. 1.

The brush adjusting brackets 46 are pivotally mounted on the ends of a tie rod 27 which is carried by the side plates 11 in holes therein. The shanks of brush adjusting brackets 46 are each provided with a slot 47. At each bracket 46 a carriage bolt 48, with a wing nut 49, is passed thru the slot 47 to fasten the bracket 46 to a handle member 57. Thus when the wing nuts are loosened, the frame side plates 11 carrying brush 25 are free to rotate in an arc limited by the length of slots 47. Such rotation of brush 25 about the axis of axle 13 effectively raises and lowers the brush to obtain efficient contact with the various types of surfaces which may be swept by the sweeper.

A handle, indicated generally at 55 is provided for manipulating the sweeper, and for raising and lowering the brush 25 during operation of the sweeper so that continual brush contact can be maintained to an uneven surface being swept.

This handle assembly 55 is shown pivotally mounted at its lower end to the axles 13 at the ends thereof. The lower handle sections 56 includes tubes, each of which is flattened at one end and punched to provide an opening of sufficient diameter to snap over the ends of axles 13. The flattened ends of the sections 56 engage shoulders on the ends of axles 13 and are retained in place by spring washers. The upper end of handle section 56 is inserted in the larger tubular handle section 57. These sections are firmly secured with a bolt 50 and a nut 51a. The ends of a U-shaped handle member 58 are inserted into the upper ends of tubular members 57. The handle assembly includes a cross-rod 59, which is tapped at each end to receive a screw 60, is inserted through aligned holes in the engaging ends of sections 57 and 58 and screws 60 are inserted to hold the sections of the handle and the cross rod in position.

Two brackets 51 for mounting the front end of the debris receptacle 40 are adapted to fit on the handle adjacent the overlapping sections 56 and 57. Each bracket has a hole 51b for carrying a support rod 68, Fig. 2, which in turn, pivotally carries the forward end of a debris receptacle 40. The debris receptacle 40 is formed with a flat bottom 65 of resilient sheet metal and with a canvas back and side walls as indicated at 66 and 67. The canvas back and side walls are hung from the handle sections 57 and the cross rod 59, utilizing hems formed in the canvas through which the handle sections are inserted. The outer edges of bottom 65 are crimped to grip the bottom edges of the canvas walls. The supporting rod 68, Fig. 2, for the receptacle is rolled into the bottom 65 at the front end thereof and adapted to extend beyond each side of the receptacle 40 to engage the holes in brackets 51.

A U-shaped handle support referred to generally at 70, Fig. 1, is provided with a straight section 73 which is rolled into the bottom 65 at the rear edge thereof, to provide a hinged mounting for the handle support 70. The straight sections 72 are normally disposed vertically when the sweeper is being operated. The U-shaped handle support can be folded, however, to a position wherein the sections 72 are disposed parallel with the bottom of the debris receptacle. To permit such folding, hooks 74 are formed in the ends of sections 72 for engaging the handle cross rod 59. These hooks are adapted to be sprung open at portion 75 so that the cross rod 59 can be disengaged from the slots 76 formed by closed hooks 74. When the hooks are thus disengaged from the cross rod 59, the U-shaped handle support 70 can be rotated about its hinged mounting so as to fold flat with the handle 55 and the bottom 65 of the debris receptacle 40, thereby providing compactness to facilitate storage and shipping of the sweeper.

When the handle support 70 is in the operating position, the cross rod 59 is confined in the slot 76 formed in the end of handle support 70, and the handle 55 is free to be raised and lowered within the limits imposed by the slot 76, without imparting motion to the debris receptacle. Handle 55 can therefore be manipulated as a lever for vertically raising and lowering sweep-in brush 25 while the sweeper is being operated, without forcing the debris receptacle 40 down against the surface being swept. More specifically, the handle 55 is in effect fastened to frame side plates 11 by adjusting brackets 46 so that raising and lowering the handle will rotate frame side plates 11 and brush 25 carried thereby, about the axis of axles 13. The brush 25 is positioned in its mounting on frame side plates 11 so as to be eccentric to the axis of the axles about which the side plates rotate. Therefore the brush may be rotated in a limited arc, thereby providing a means for vertically adjusting the brush relative to the surface being swept. It should be noted that were not the slots 76 provided on the handle support 70 for receiving cross rod 59, any attempt to lower brush 25 by manipulation of handle 55 would be opposed, as the bottom 65 of debris receptacle 40 would be forced against the surface being swept.

The portion of the hook, directly above the latch portion 75, forms a shoulder. When the sweeper is standing at rest and the handle 55 is not being manipulated, the shoulder of portion 75 carries cross rod 59, thereby supporting handle 55 inclined at a convenient operating angle so that the handle may be readily grasped without stooping.

Referring particularly to the dust receptacle, it is seen that the forward edge of the bottom 65 of the debris receptacle 40 is vertically positioned higher than the rearward edge so that the bottom 65 assumes the upwardly sloping curve indicated generally at 71 in Fig. 2.

Debris swept up by the brush is directed against a hood 32 so formed, as shown in Fig. 2, to discharge the debris backward over the brush and into the receptacle.

In operation, the rotary sweeping brush is adjusted up or down by first loosening the carriage bolt 48 and wing nut 49 so that the bolt can be moved in slot 47 of adjusting bracket 46. The loosened bolt is moved in the slot 47, thereby rotating the frame side plates 11 and the brush carried thereby, so that the brush just contacts the gass or surface to be swept. The handle 55, being normally carried in the handle support hook 74, is inclined so as to be readily grasped. The sweeper is moved by pushing handle 55, and manipulation of the handle within the limits imposed by the length of slot 76 serves to momentarily raise or lower brush 25 for uneven sweeping. For storage the sweeper is made more compact by manually springing apart hook 74 near 75 so that the cross rod 59 may be removed from confinement in slot 76 allowing the U-shaped handle 70 to be folded to a position parallel to the bottom of the debris receptacle, as seen in Fig. 2. The canvas walls of the debris receptacle are then collapsed and the metal bottom of the debris receptacle is rotated about its forward mounting to a position parallel to and flat against the handle.

While the form of embodiment of the present invention as herein disclosed constitutes a preferred form, it is to be understood that other forms might be adopted, all coming within the scope of the claims which follow.

I claim:

1. A lawn sweeper or the like comprising a frame; wheels for the frame; an element in the form of a handle connected with the frame for manipulation of the sweeper; a debris receiving element having flexible side walls, the upper ends of which are attached directly to the handle element; a handle element supporting member mounted to one of said elements and extending to engage the other of said elements; and a lost motion connection connected between said member and the other of said elements.

2. A lawn sweeper or the like comprising a frame; wheels for the frame; an element in the form of a handle connected with the frame for manipulation of the sweeper; a debris receiving element having flexible side walls, the upper ends of which are attached directly to the handle element; a handle element supporting member pivotally mounted to one of said elements and extending to engage the other of said elements; and a lost motion connection connected between said member and said other element.

3. A lawn sweeper or the like comprising a frame; wheels for the frame; a handle connected with the frame for manipulation of the sweeper; a debris receptacle having flexible side walls, the upper ends of which are attached directly to the handle; a handle supporting member pivotally mounted on the bottom of the receptacle and extending to engage the handle; and a lost motion connection connected between said member and handle.

4. A lawn sweeper or the like comprising a frame; wheels for the frame; a handle having the lower end thereof connected with the frame for manipulating the sweeper, said handle extending upwardly-rearwardly of the frame, said handle including a rod; a debris receptacle having flexible side walls carried directly by the handle; a handle supporting means attached to the bottom of the receptacle, said means including a loop section encircling the rod and forming a supporting shoulder for the rod, said loop section being of greater vertical length than the diameter of the rod.

5. A lawn sweeper or the like comprising a frame; wheels for the frame; a handle having the lower end thereof connected with the frame for manipulating the sweeper, said handle extending upwardly-rearwardly of the frame, said handle including a rod; a debris receptacle having flexible side walls carried directly by the handle; a handle supporting means including a loop section pivotally encircling the rod and forming a supporting shoulder for the rod, said loop section being of greater vertical length than the diameter of the rod.

6. A lawn sweeper or the like comprising a frame; wheels for the frame; a handle having the lower end thereof connected with the frame for manipulating the sweeper, said handle extending upwardly-rearwardly of the frame, said handle including a rod; a debris receptacle having flexible side walls carried directly by the handle; a handle supporting means attached to the bottom of the receptacle, said means including a loop section encircling the rod and forming a supporting shoulder for the rod, said loop section being of greater vertical length than the diameter of the rod, said loop section having a spreadable leg normally biased toward loop closing position.

7. A lawn sweeper or the like comprising a frame; wheels for the frame; a handle having the lower end thereof connected with the frame for manipulating the sweeper, said handle extending upwardly-rearwardly of the frame, said handle including a rod; a debris receptacle having flexible side walls carried directly by the handle; a handle supporting member attached to the bottom of the receptacle and including an integrally formed loop section at the upper end thereof, said member encircling the rod and forming a supporting shoulder for the rod, said loop section being of greater vertical length than the diameter of the rod.

8. A lawn sweeper or the like comprising a frame; wheels for the frame; a handle having the lower end thereof connected with the frame for manipulating the sweeper, said handle extending upwardly-rearwardly of the frame, said handle including a rod; a debris receptacle having flexible side walls carried directly by the handle; a handle supporting member pivotally attached to the bottom of the receptacle and including an integrally formed loop section at the upper end thereof, said loop section encircling the rod and forming a supporting shoulder for the rod and said loop section being of greater vertical length than the diameter of the rod.

References Cited in the file of this patent

UNITED STATES PATENTS

| | | |
|---|---|---|
| 432,307 | Grimes | July 15, 1890 |
| 2,431,834 | Sinclair | Dec. 2, 1947 |